United States Patent [19]

Blanes

[11] Patent Number: 5,317,986
[45] Date of Patent: Jun. 7, 1994

[54] VEHICULAR HORN INDICATOR

[76] Inventor: Elwood J. Blanes, 374 Lake Desire Dr. N., Renton, Wash. 98058

[21] Appl. No.: 69,749

[22] Filed: Jun. 1, 1993

[51] Int. Cl.$^5$ .............................................. B60Q 9/00
[52] U.S. Cl. .................................. 116/28 R; 116/202; 200/333
[58] Field of Search ................. 40/593, 594, 630, 638; 116/28 R, 202, 3, 200, 279, 137 R; 200/314, 330, 333

[56] References Cited

U.S. PATENT DOCUMENTS

| | | | |
|---|---|---|---|
| 1,777,897 | 10/1930 | Rothauser | 40/495 |
| 2,778,903 | 1/1957 | Hopkins, Jr. | 116/202 X |
| 4,236,479 | 12/1980 | Walker et al. | 116/28 R |
| 4,977,300 | 12/1990 | Schroeder | 200/331 X |

Primary Examiner—William A. Cuchlinski, Jr.
Assistant Examiner—W. Morris Worth
Attorney, Agent, or Firm—Leon Gilden

[57] ABSTRACT

A vehicular steering wheel horn surface receives a pad member, having an adhesive layer for adherence of the pad member to provide for projection for enhanced physical indication of the horn surface in use.

4 Claims, 4 Drawing Sheets

VEHICULAR HORN INDICATOR

BACKGROUND OF THE INVENTION

1. Field of the Invention

The field of invention relates to vehicular horn structure, and more particularly pertains to a new and improved vehicular horn indicator wherein the same is directed to the projection of a pad member to enhance physical access to the horn actuating surface on the steering wheel.

2. Description of the Prior Art

Vehicular horn structure of various types have been utilized throughout the prior art in contemporary motor vehicles. Typical steering wheels employ a horn actuating surface, whereupon applying pressure to such surface or surfaces effects actuation of the associated horn structure. To this end, during emergency situations and the like, an air interrupted surface of the steering wheel presents problems for a driver and operator of a vehicle to locate the horn actuating surface.

The instant invention attempts to overcome deficiencies of the prior art by providing for a projection mounted to the horn surface for ease of physical indication of the horn surface permitting actuation of the associated vehicle steering wheel horn and in this respect, the present invention substantially fulfills this need.

SUMMARY OF THE INVENTION

In view of the foregoing disadvantages inherent in the known types of horn apparatus now present in the prior art, the present invention provides a vehicular horn indicator wherein the same provides for a retrofit projection arranged in mounted contiguous communication to the vehicular horn surface of a vehicular steering wheel. As such, the general purpose of the present invention, which will be described subsequently in greater detail, is to provide a new and improved vehicular horn indicator which has all the advantages of the prior art vehicular horn structure and none of the disadvantages.

To attain this, the present invention provides a vehicular steering wheel horn surface receiving a pad member, having an adhesive layer for adherence of the pad member to provide for projection for enhanced physical indication of the horn surface in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular horn indicator which has all the advantages of the prior art vehicular horn apparatus and none of the disadvantages.

It is another object of the present invention to provide a new and improved vehicular horn indicator which may be easily and efficiently manufactured and marketed.

It is a further object of the present invention to provide a new and improved vehicular horn indicator which is of a durable and reliable construction.

An even further object of the present invention is to provide a new and improved vehicular horn indicator which is susceptible of a low cost of manufacture with regard to both materials and labor, and which accordingly is then susceptible of low prices of sale to the consuming public, thereby making such vehicular horn indicators economically available to the buying public.

Still yet another object of the present invention is to provide a new and improved vehicular horn indicator which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
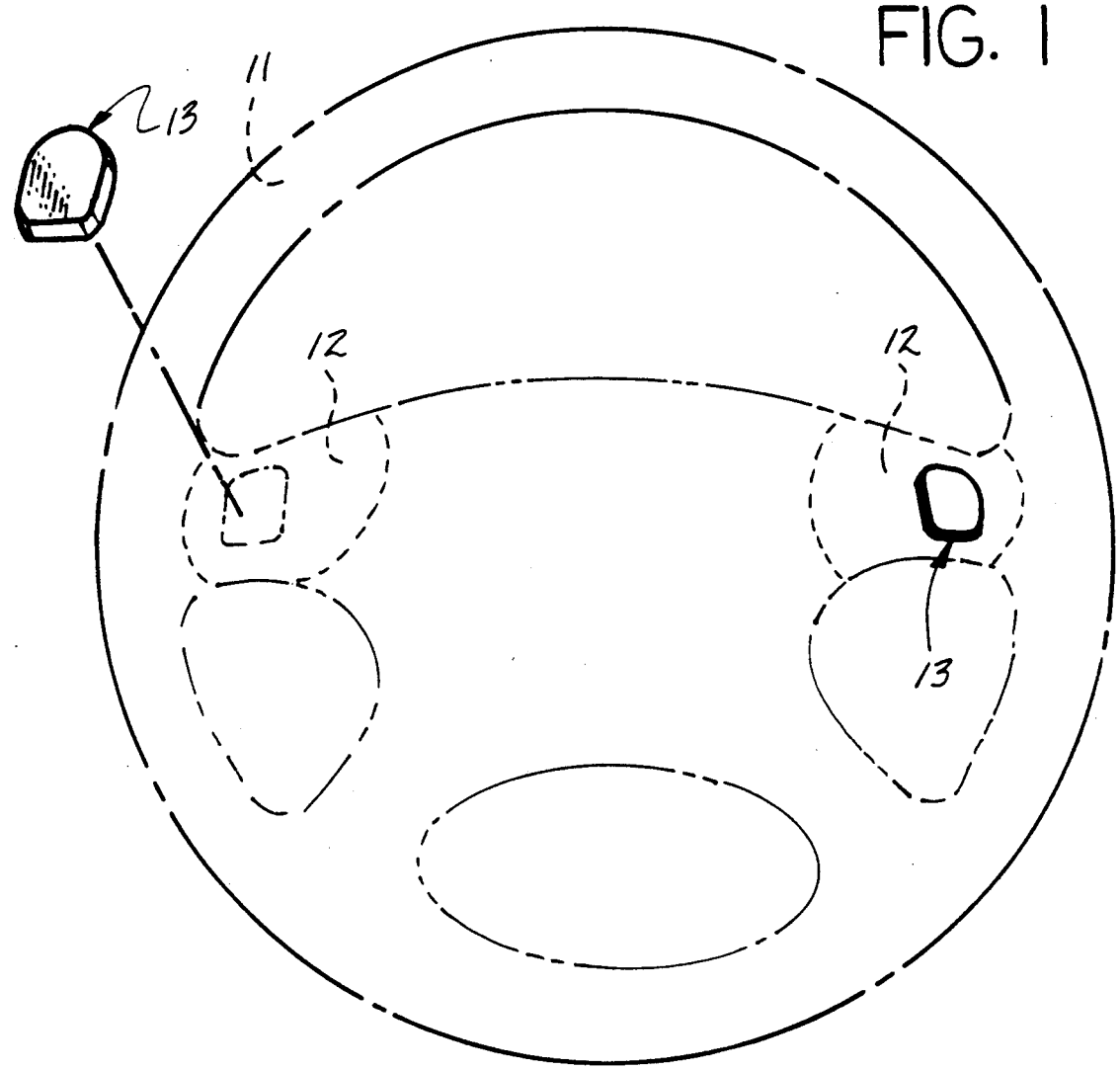
FIG. 1 is an orthographic view of the invention.

With reference now to the drawings, and in particular to FIGS. 1 to 9 thereof, a new and improved vehicular horn indicator embodying the principles and concepts of the present invention and generally designated by the reference numerals 11-34 will be described.

Figures 2, 3:
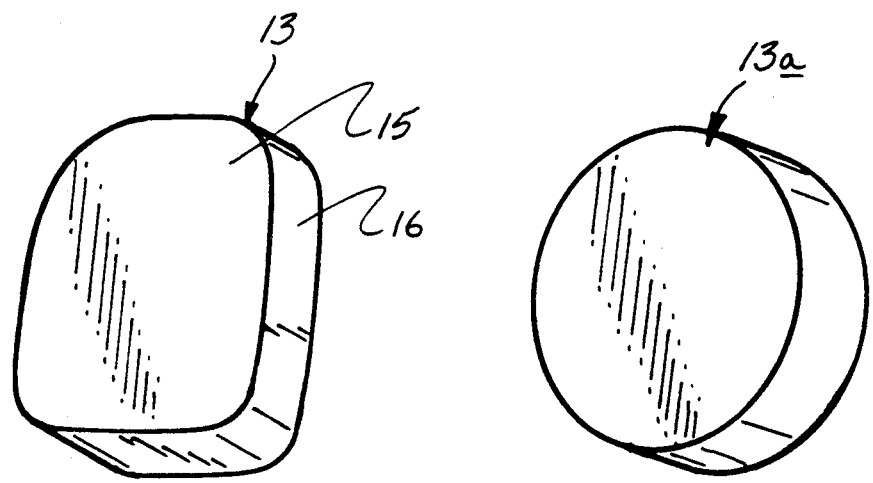
FIG. 2 is an isometric illustration of a pad member for use by the invention.
FIG. 3 is an isometric illustration of a modified pad member of varying configuration.
Figure 4:
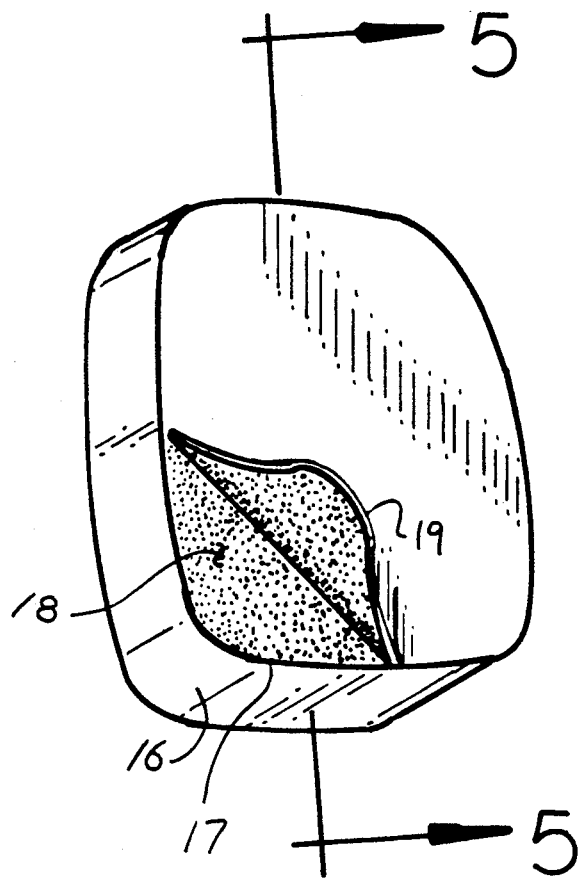
FIG. 4 is an isometric bottom view of the invention.
Figure 5:
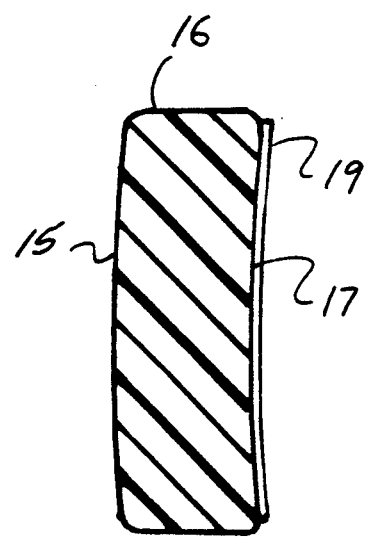
FIG. 5 is an orthographic view, taken along the lines 5—5 of FIG. 4 in the direction indicated by the arrows.

More specifically, the vehicular horn indicator of the instant invention essentially comprises cooperation with a steering wheel 11, having a horn surface 12 directed between an outer circular portion of the steering wheel. A pad member 13 is provided, or alternatively a pad member 13a of varying configuration, as indicated in FIG. 3, may be employed such that the pad member includes a top wall 15 spaced from a bottom wall 17, having a contiguous side wall 16. An adhesive layer 18 is coextensive with the bottom wall 17, with a peel-away cover web 19 arranged for removably mounting such cover web to the adhesive layer 18 permitting selective exposure of the adhesive layer 18 for its adherence onto the steering wheel horn surface 12. The peel-away cover web 19 is typically of a flexible construction to this end.

Figure 6:
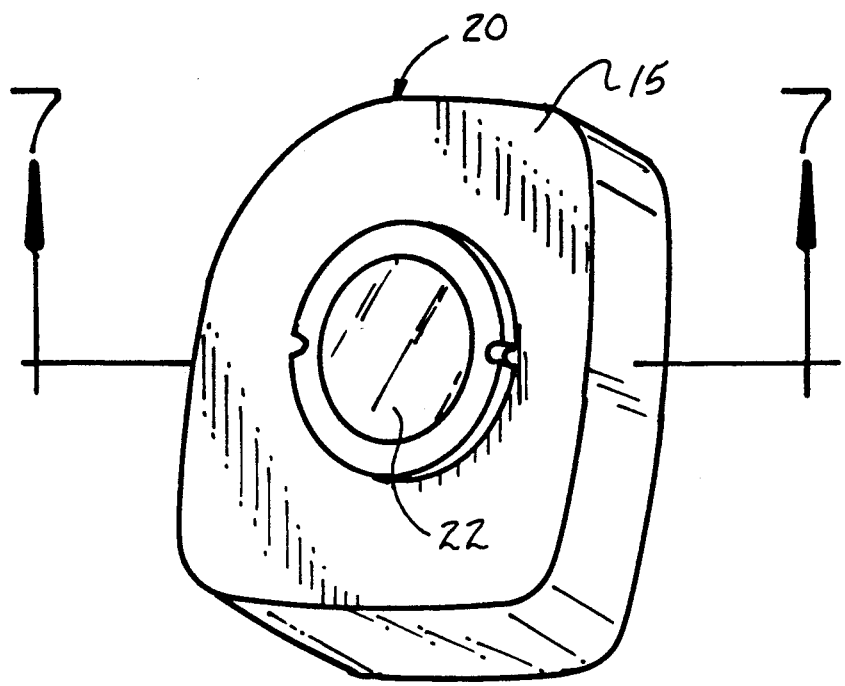
FIG. 6 is an isometric illustration of a modified pad member for use by the invention.
Figure 7:
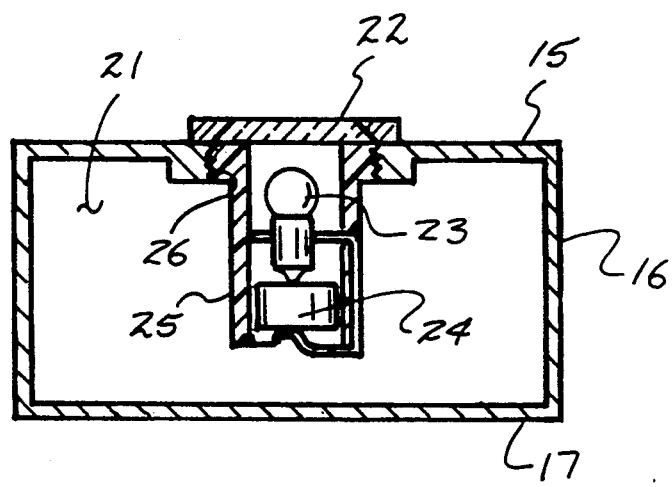
FIG. 7 is an orthographic view, taken along the lines 7—7 of FIG. 6 in the direction indicated by the arrows.

The FIG. 6 and the FIG. 7 indicates the use of a modified pad member 20, having a pad member cavity 21 therewithin. A lens 22 is provided fixedly mounted to an illumination housing externally threaded flange 26 of an illumination housing 25. The illumination housing 25 is orthogonally oriented to the top wall 15 within the cavity 21 such that an illumination bulb 23 mounted within the illumination housing 25 is positioned in adjacency to the lens 22, with the bulb 23 in electrical communication with a battery 24 to effect illumination of the bulb 23 effecting illumination through the lens 22 that may be formed of a transparent or translucent material to provide for visual, as well as physical, indication of the steering wheel horn surface 12 when mounted to the steering wheel, in a manner as indicated in FIG. 1.

Figure 8:
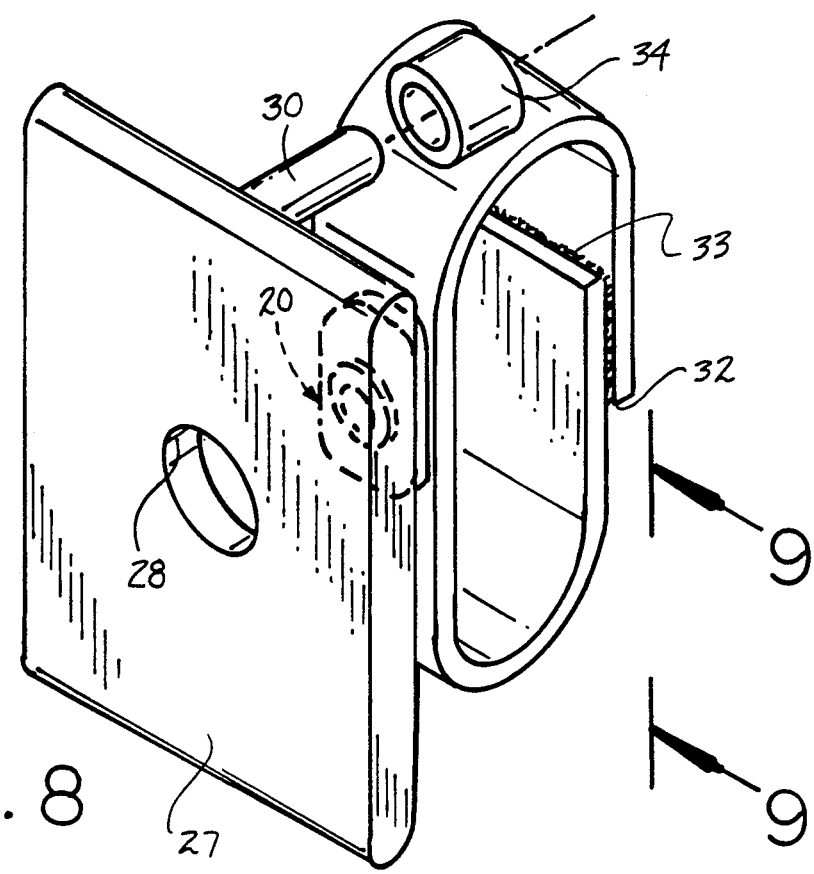
FIG. 8 is an isometric illustration of a further modified organization for use by the invention.
Figure 9:
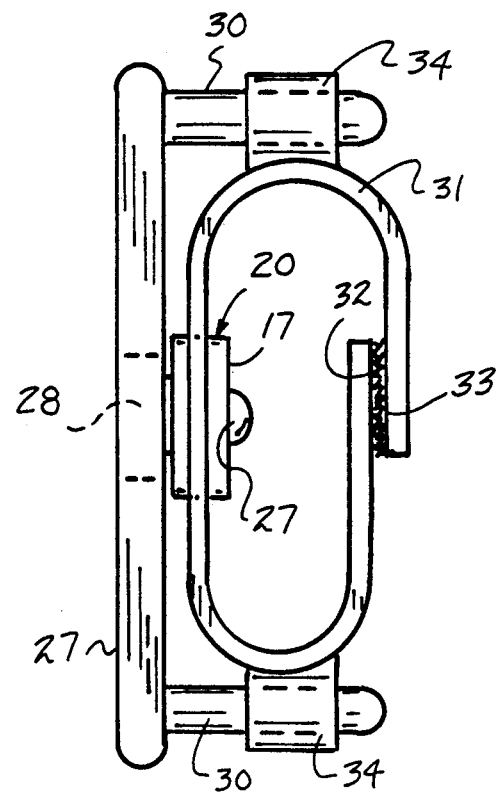
FIG. 9 is an orthographic view, taken along the lines 9—9 of FIG. 8 in the direction indicated by the arrows.

The FIGS. 8 and 9 indicates a further modified organization of the invention, wherein the modified pad member 20 includes a bottom wall projection 27 for enhanced pressurizing of the horn surface 12 to effect its contact, with the pad member 20 mounted to a plate member 28, and more specifically to the plate member bottom wall coaxially aligned with the plate member bore 29 directed through the plate member to permit visual observation of the lens 22. The plate member includes a plurality of rods 30 fixedly and orthogonally mounted to the bottom wall of the plate member 28, with the rods slidably received through alignment sleeves 34. The alignment sleeves 34 are mounted to a mounting web 31 that in turn is secured about the side walls 16, with the mounting web 31 having a first end hook and loop fastener 32 cooperative with a second end hook and loop fastener 33 providing ease of wrap around mounting of the mounting web 31 about the steering wheel horn surface 32 in surrounding relationship relative to a steering wheel portion indicated as a spoke member directed between the outer circular perimeter of the steering wheel.

In this manner, an enhanced securement of the pad member is afforded in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular horn indicator in combination with a steering wheel, wherein the steering wheel includes at least one spoke member, and the spoke member including at least one horn surface, wherein the indicator further comprises, a pad member, the pad member including a top wall, a bottom wall, and a continuous side wall, the bottom wall including an adhesive layer in contiguous communication with the horn surface; said pad member projecting away from the horn surface to enhance physical indication of the horn surface.

2. A vehicular horn indicator as set forth in claim 1 wherein the pad member includes a cavity within the pad member, and a translucent lens having an illumination housing fixedly mounted to the lens, the illumination housing including an externally threaded flange, the externally threaded flange is threadedly received within the top wall, and the illumination housing orthogonally oriented to the top wall within the cavity, the illumination housing including a battery and an illumination bulb, with the illumination bulb positioned in adjacency to the lens, with the illumination bulb and illumination battery in electrical communication relative to one another to direct illumination through the lens.

3. A vehicular horn indicator in combination with a steering wheel, wherein the steering wheel includes at least one spoke member, and the spoke member including at least one horn surface, wherein the indicator further comprises:

a pad member, the pad member including a top wall, a bottom wall, and a continuous side wall, the bottom wall including a bottom wall projection for preloading said horn surface to permit ease of deflection of said horn surface;

said pad member including a cavity within the pad member, and a translucent lens having an illumination housing fixedly mounted to the lens, the illumination housing including an externally threaded flange, the externally threaded flange is threadedly received within the top wall, and the illumination housing orthogonally oriented to the top wall within the cavity, the illumination housing including a battery and an illumination bulb, with the illumination bulb positioned in adjacency to the lens, with the illumination bulb and illumination battery in electrical communication relative to one another to direct illumination through the lens; and means for securing said pad member to said spoke member such that said indicator enhances indication of the horn surface.

4. A vehicular horn indicator as set forth in claim 3 wherein said means for securing said pad member including a rigid plate member having a plate member bore, the plate member bore coaxially aligned with the lens and the plate member having a plate member bottom wall in contiguous communication with said top wall, and the plate member having a plurality of rigid rods fixedly and orthogonally mounted to the plate member bottom wall, and a mounting web, the mounting web secured to said side wall, and the mounting web having a mounting web first end hook and loop fastener cooperative with a second end hook and loop fastener for securement of the mounting web about the spoke member, the mounting web including a plurality of alignment sleeves, wherein each of said alignment sleeves slidably receives one of said rods therethrough to maintain alignment of the plate member with said mounting web.

* * * * *